(12) United States Patent
Chang (10) Patent No.: US 7,174,916 B2
(45) Date of Patent: Feb. 13, 2007

(54) FLOW AND TEMPERATURE SEPARATION CONTROL VALVE

(75) Inventor: Weichi Chang, Taichung (TW)

(73) Assignee: Globe Union Industrial Corp., Taichung (TW)

( * ) Notice: Subject to any disclaimer, the term of this patent is extended or adjusted under 35 U.S.C. 154(b) by 338 days.

(21) Appl. No.: 10/926,025

(22) Filed: Aug. 26, 2004

(65) Prior Publication Data

US 2006/0042705 A1    Mar. 2, 2006

(51) Int. Cl.
    *F16K 11/18* (2006.01)
(52) U.S. Cl. ............................. 137/637.3; 137/625.41
(58) Field of Classification Search ............ 137/637.3, 137/637.5, 636.2, 625.41, 801
    See application file for complete search history.

(56) References Cited

U.S. PATENT DOCUMENTS 3,625,255 A * 12/1971 Genin ..................... 137/637.3
3,987,819 A * 10/1976 Scheuermann ............ 137/637.3
6,640,357 B1 * 11/2003 Chang ..................... 137/637.3
7,007,717 B2 * 3/2006 Lin ........................ 137/625.41

* cited by examiner

*Primary Examiner*—Kevin Lee
(74) *Attorney, Agent, or Firm*—Troxell Law Office, PLLC (57) ABSTRACT

A flow and temperature separation control valve includes a valve housing for connecting to a water faucet, a temperature control module received in the valve housing for controlling the temperature of the outputted water flow, and a flow control module received in the valve housing for controlling the outputted flow. The valve housing includes an upper housing and a lower housing. The temperature control module includes a rotation shaft having a straight post non-interferentially extending from the upper portion of the upper housing, a water division seat mounted on the lower housing. The water division seat connects the lower housing and the upper housing together. The flow control module includes a rotation cover covering the upper portion of the upper housing, a flow control plate pivotally disposed betwee the water division seat and the lower housing. Thereby separately controlling water temperature and water flow for convenient use.

17 Claims, 7 Drawing Sheets

FLOW AND TEMPERATURE SEPARATION CONTROL VALVE

BACKGROUND OF THE INVENTION

1. Field of the Invention

The present invention relates to a flow and temperature control valve, and particularly to a flow and temperature separation control valve which can separately control water flow and water temperature.

2. Prior Art

Figure 1:
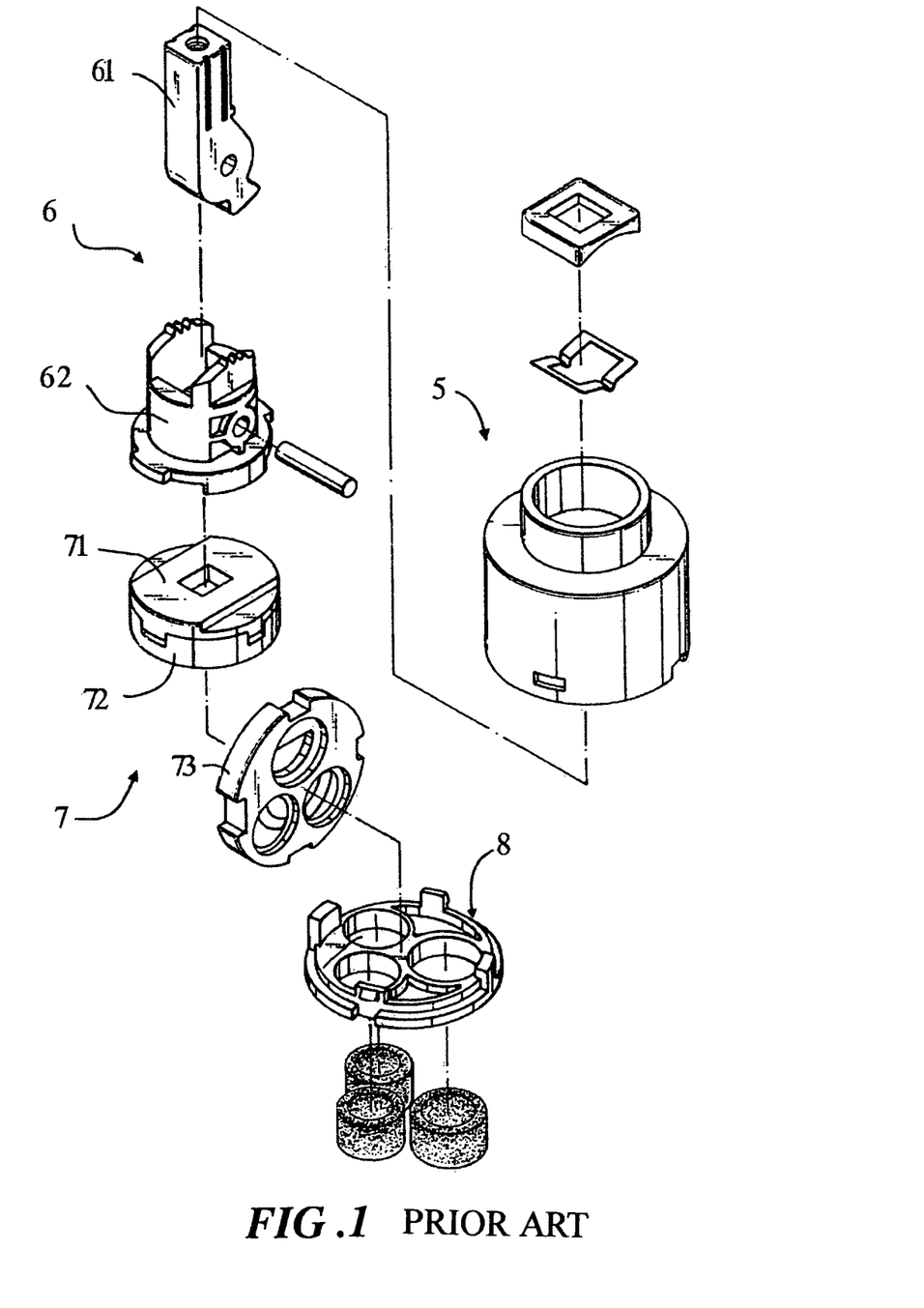
FIG. 1 is an exploded view of a conventional flow and temperature control valve.

Referring to FIG. 1, a conventional flow and temperature control valve for a water faucet includes a valve housing 5, a control module 6 which includes a control lever 61 and a control lever seat 62, a driven module 7 which includes a slide control plate 71, an upper ceramic plate 72, a lower ceramic plate 73, and a water division seat 8.

Water flow is controlled through the control module 6 to linearly adjust the slide control plate 71. Water temperature is controlled through rotation of the upper ceramic plate 72. Therefore, the conventional flow and temperature control valve has functions of water flow and temperature control.

However, since the control module 6 for controlling water flow and the driven module 7 for controlling water temperature are linked to readily move together, it is hard to control water flow or water temperature separately through the conventional flow and temperature control valve. That's, when it is desired to change water flow, water temperature is also changed undesirably, or when it is desired to change water temperature, water flow is also changed undesirably. Thus, it is inconvenient to use the conventional flow and temperature control valve.

SUMMARY OF THE INVENTION

Accordingly, an object of the present invention is to provide a flow and temperature separation control valve which includes a temperature control module and a flow control module not linked to move together thereby separately controlling water temperature and water flow for convenient use.

To achieve the above-mentioned object, a flow and temperature separation control valve in accordance with the present invention includes a valve housing for connecting to a water faucet, a temperature control module received in the valve housing for controlling the temperature of the outputted water flow, and a flow control module received in the valve housing for controlling the outputted flow. The valve housing includes an upper housing and a lower housing. The temperature control module includes a rotation shaft having a straight post non-interferentially extending from the upper portion of the upper housing, an upper ceramic plate mounted on the bottom of the rotation shaft and rotatable with the rotation shaft, a lower ceramic plate disposed below the upper ceramic plate and closely jointing to the upper ceramic plate, and a water division seat mounted on the lower housing. The water division seat connects the lower housing and the upper housing together. The water division seat supports the lower ceramic plate thereon. The flow control module includes a rotation cover covering the upper portion of the upper housing, a driven member received in the upper housing, and a flow control plate pivotally disposed between the water division seat and the lower housing. A through hole is defined in the center of the rotation cover for non-interferential extension of the straight post of the rotation shaft. The driven member receives the rotation shaft, the upper ceramic plate, the lower ceramic plate and the water division seat therein and is rotatable with the rotation cover. The driven member is drivable the flow control plate to rotate.

Other objects, advantages and novel features of the present invention will be drawn from the following detailed embodiments of the present invention with attached drawings, in which:

DESCRIPTION OF THE PREFERRED EMBODIMENT

Figure 2:
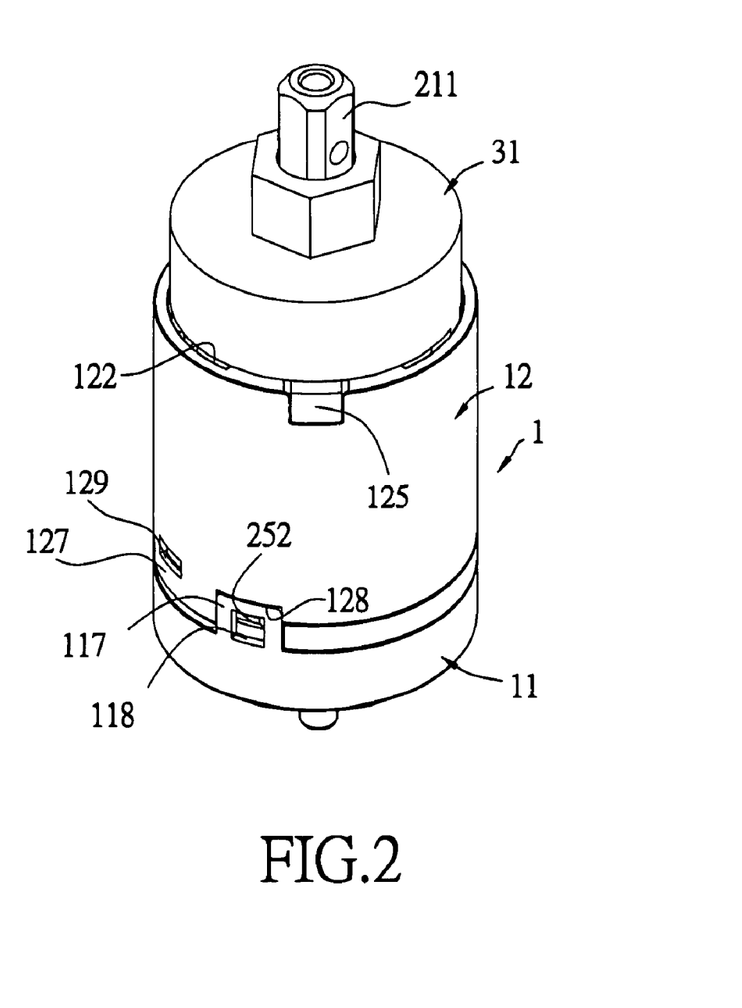
FIG. 2 is a perspective view of a flow and temperature separation control valve of the present invention.
Figure 3:
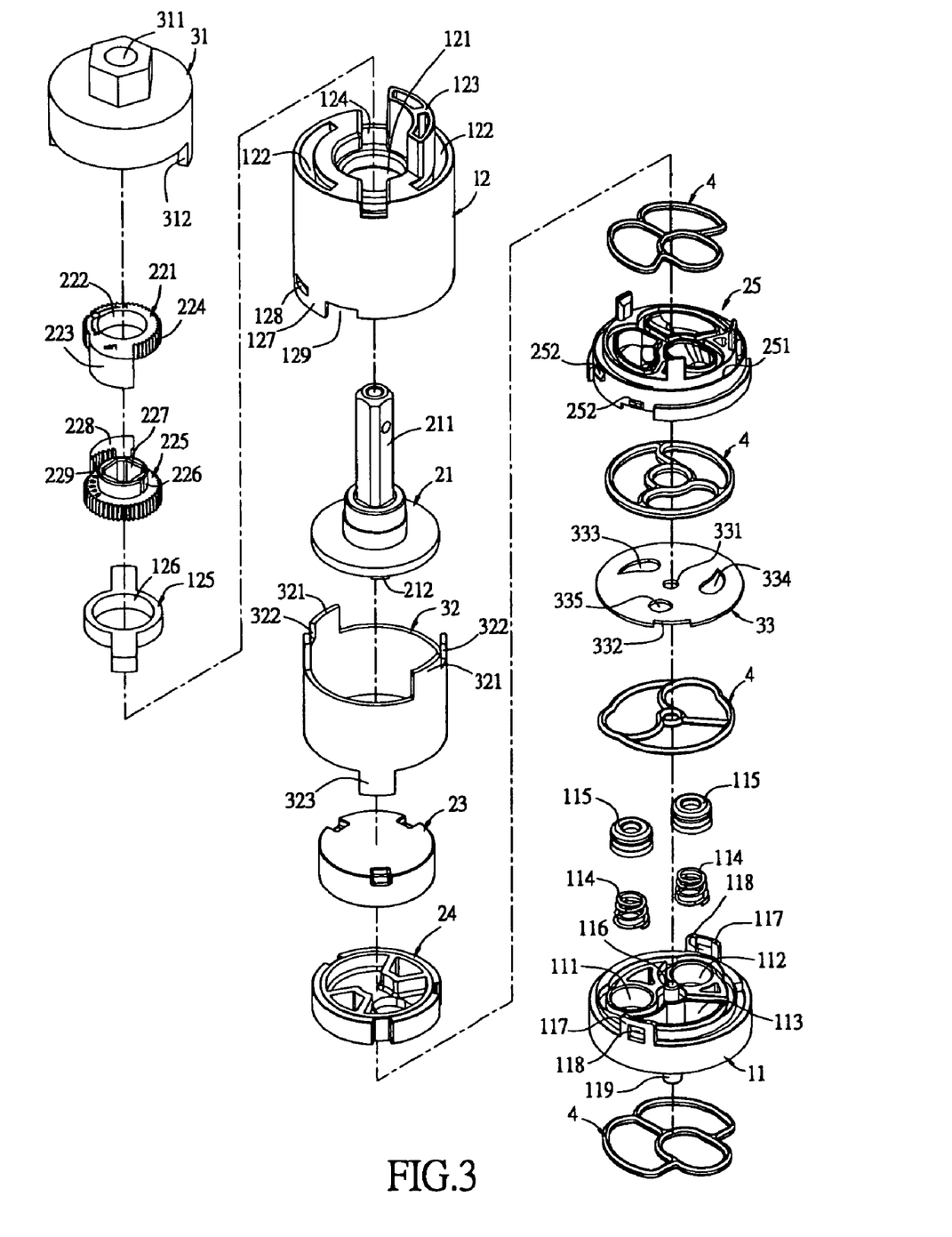
FIG. 3 is an exploded view of FIG. 2.

Referring to FIGS. 2–3, a flow and temperature separation control valve of the present invention includes a valve housing 1, a temperature control module 2 and a flow control module 3.

The valve housing 1 for receiving the temperature control module 2 and the flow control module 3 therein includes a lower housing 11 and an upper housing 12.

The lower housing 11 includes hot and cold water inlets 111, 112 respectively in communication to water faucets (not shown) and a mixed water outlet 113. Each of the hot water inlet 111 and the cold water inlet 112 has a tubular rubber aqueduct sleeving 115 in which a compression spring 114 is disposed. A pivot shaft 116 shaped as a short cylinder is formed at the center of the lower housing 11. Two symmetrical upper tab 117 upwardly extend from the upper periphery of the lower housing 11. An engaging hole 118 is defined in each of the upper tabs 117. A plurality of positioning pins 119 each shaped as a short cylinder is formed at the bottom of the lower housing 11.

The upper housing 12 is generally close at the upper portion thereof, hollow at the middle portion thereof and open at the lower poriton thereof. A shaft through hole 121 is defined in the center of the upper portion of the upper housing 12. Two symmetrical arcuate rotation guidance grooves 122 are defined in the upper periphery of the upper housing 12. A fan-shaped protruding restriction block 123 extends from the upper end surface of the upper housing 12. An engaging recess 124 is defined in the upper end surface of the upper housing 12. A metallic strengthening block 125 with a through hole 126 being defined in the center thereof is received in the engaging recess 124. Two symmetrical lower tabs 127 downwardly extend from the lower periphery of the upper housing 12. A receiving cutout 129 is defined adjacent to each lower tab 127 for providing access to the upper tab 117 of the lower housing 11. An engaging hole 128 is defined in each of the lower tabs 127.

Figure 4:
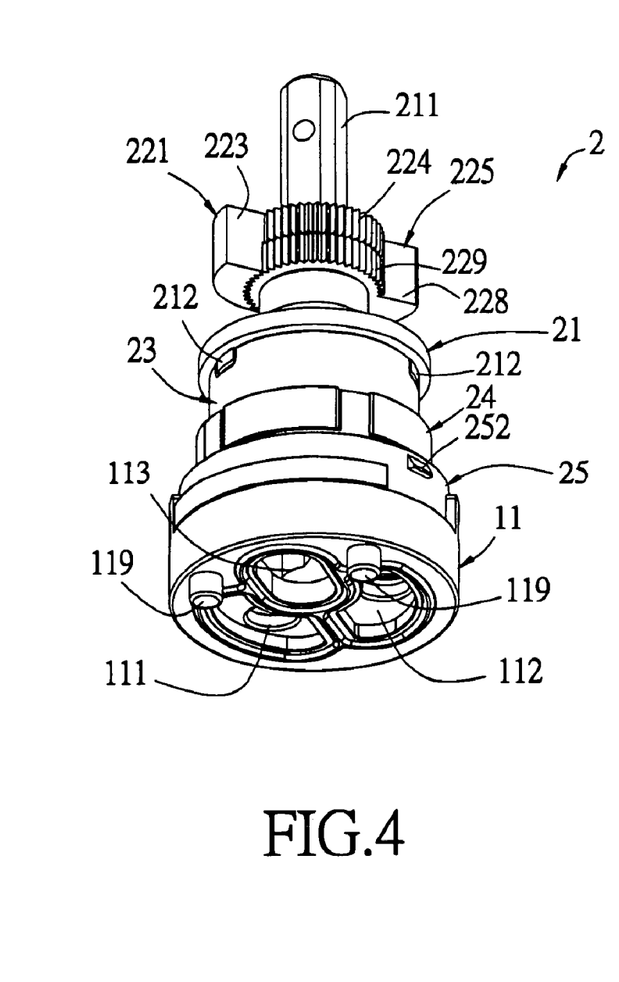
FIG. 4 is a perspective view of a temperature control module.

Referring to FIG. 4, the temperature control module 2 includes a rotation shaft 21 for driving a temperature regulation mechanism, a temperature restriction unit 22 for providing a temperature regulation range, an upper ceramic plate 23 rotatable with the rotation shaft 21, a lower ceramic plate 24 tightly jointing to the upper ceramic plate 23, and a water division seat 25 supporting the lower ceramic plate 24 thereon. The upper ceramic plate 23, the lower ceramic plate 24 and the water division seat 25 are similar to prior art and so are not detailedly described herein.

The rotation shaft 21 is generally a reversed T-shape and is received in the upper housing 12. The rotation shaft 21 has a straight post 211 projecting from the shaft through hole 121 of the upper housing 12. The straight post 211 has a square cross section. A plurality of driving blocks 212 extends from the bottom of the rotation shaft 21 (see FIG. 5) for engaging with cavities defined in the upper ceramic plate 23.

The temperature restriction unit 22 includes a right restriction block 221 and a left restriction block 225. A tube receiving hole 222 is defined in the center of the right restriction block 221. A wing-shaped right block 223 (see FIG. 6) outwardly and downwardly extends from the periphery of the right restriction block 221 for abutting against the restriction block 123 of the upper housing 12 when rotating. A plurality of successional aligning teeth 224 is formed at the inner side surface of the right block 223 and at the peripheral surface of the right restriction block 221.

The left restriction block 225 has a tube 226 projecting from the center thereof for extending into the tube receiving hole 222 of the right restriction block 221. A shaft receiving hole 227 is defined along an axis of the left restriction block 225 and has a cross section consistent to that of the straight post 211 of the rotation shaft 21 for extension of the straight post 211 of the rotation shaft 21 thereby rotating with the rotation shaft 21. A wing-shaped left block 228 (see FIG. 5) outwardly and upwardly extends from the periphry of the left restriction block 225 for abutting against the restriction block 123 of the upper housing 12 when rotating. A plurality of successional engaging teeth 229 is formed at the inner side surface of the left block 228 and at the peripheral surface of the left restriction block 225 for mating with the aligning teeth 224 of the right restriction block 221 and the right block 223. The upper portion of the upper ceramic plate 23 has a close end surface.

Figure 5:
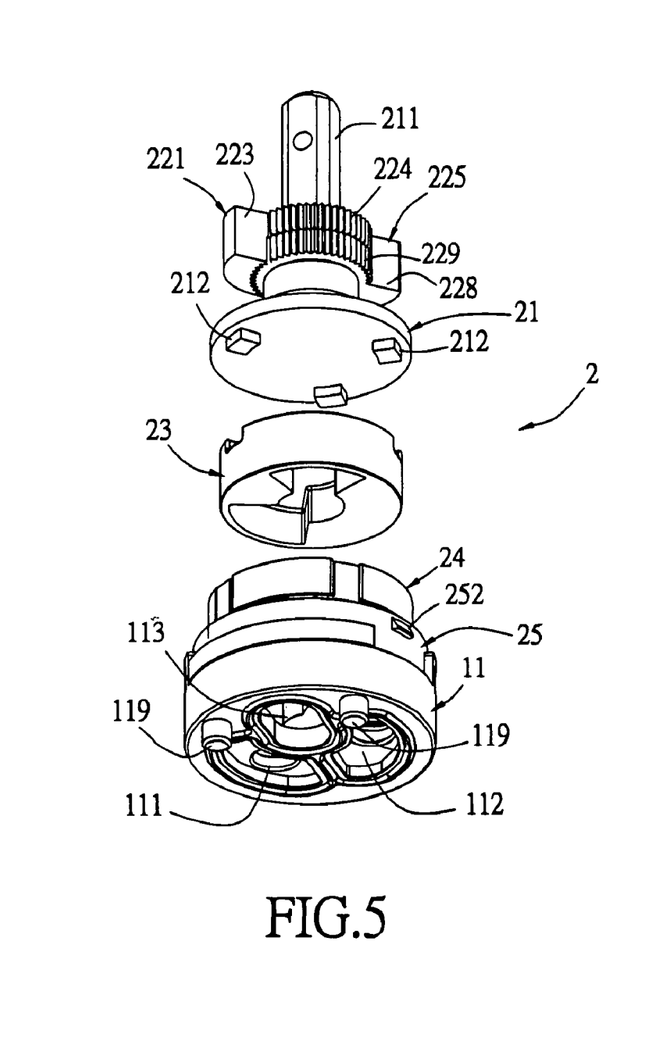
FIG. 5 is an exploded view of FIG. 4.

An arcuate receiving groove 251 is defined in the water division seat 25 adjacent to the periphery thereof. Two pairs of engaging protrusions 252 extend from the peripheral surface of the water division seat 25 for respectively engaging with the upper tabs 117 of the lower housing 11 and the lower tabs 127 of the upper housing 12.

Figure 7:
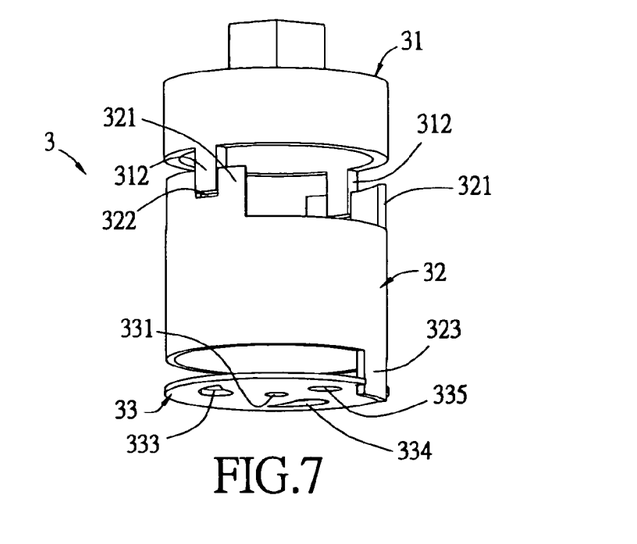
FIG. 7 is an exploded view of a flow control module.
Figure 8:
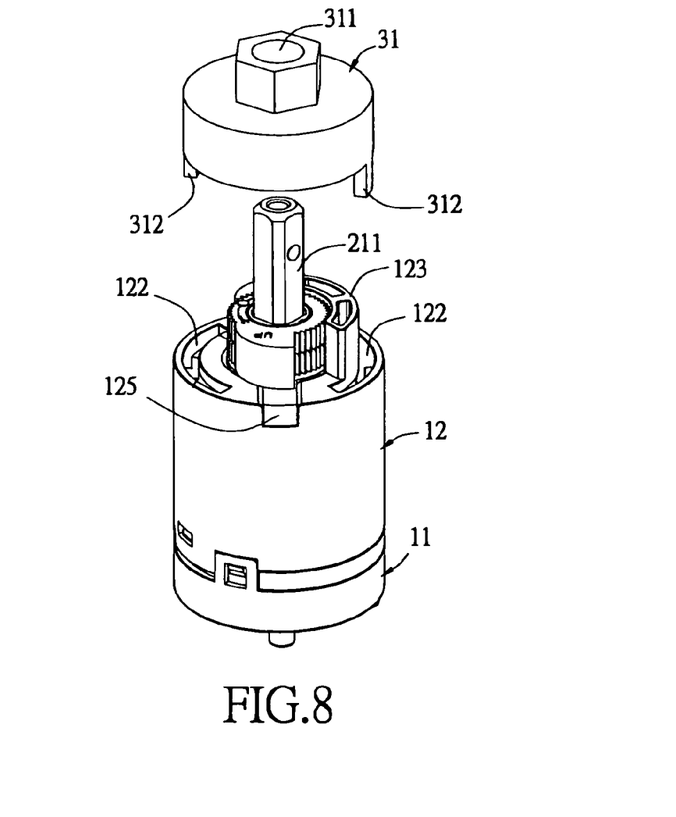
FIG. 8 is an exploded view of a rotation cover and an upper housing of the temperature control module.

Referring to FIG. 7, the flow control module 3 includes a rotation cover 31, a driven member 32 and a flow control plate 33. The rotation cover 31 covers the upper housing 12. A shaft through hole 311 is defined in the center of the rotation cover 31 for non-interferential extension of the straight post 211 of the rotation shaft 21. Two symmetrical driving plates 312 (see FIG. 8) downwardly extend from the lower periphery of the rotation cover 31 for respectively extending into the rotation guidance grooves 122 of the upper housing 12.

The driven member 32 is received in the upper housing 12. Two symmetrical position restriction plates 321 upwardly extend from the upper periphery of the driven member 32. A mating cutout 322 is defined in each of the position restriction plates 321 for insertion of the driving plate 312 of the rotation cover 31. A driven plate 323 downwardly extends from the lower periphery of the driven member 32 for extending through the receiving groove 251.

The flow control plate 33 is pivotally connected between the lower housing 11 and the water division seat 25. A pivot shaft hole 331 is defined in the center of the flow control plate 33 for extension of the pivot shaft 116 of the lower housing 11. A mating cutout 332 is defined in the periphery of the flow control plate 33 for receiving the driven plate 323 of the driven member 32. A hot water through hole 333, a cold water through hole 334, and a mixed water through hole 335 are respectively defined in the flow control plate 33.

Referring to FIGS. 3–8, in assembly, the assembling steps are described as follows.

1. Providing the lower housing 11 with leakproof gaskets 4 mounted on the upper and lower portions thereof, inserting the aqueduct sleevings 115 each with the compression spring 114 received therein into the hot water inlet 111 and the cold water inlet 112, thereby finishing the assembly of the lower housing 11;

2. Horizontally placing the flow control plate 33 on the lower housing 11, thereby finishing the assembly of the flow control plate 33;

3. Providing the water division seat 25 with leakproof gaskets 4 being respectively attached to the upper and lower portions thereof to abut against the flow control plate 33, engaging the engaging hole 118 of the lower housing 11 with the engaging protrusion 252 of the water division seat 25, thereby finishing the assembly of the lower housing 11, the flow control plate 33 and the water division seat 25;

4. Aligningly placing the lower ceramic plate 24 on the water division seat 25, thereby finishing the assembly of the lower ceramic plate 24; aligningly and closely jointing the upper ceramic plate 23 to the lower ceramic plate 24, thereby finishing the assembly of the upper ceramic plate 23;

5. Aligningly connecting the rotation shaft 21 to the upper ceramic plate 23, thereby finishing the assembly of the rotation shaft 21;

6. Connecting the driven member 32 to the water division seat 25 whereby the driven plate 323 extending through the receiving groove 251 of the water division seat 25 and is received in the mating cutout 332 of the flow control plate 33 thereby finishing the assembly of the driven member 32 and the flow control plate 33;

7. Providing the upper housing 12 with the strengthening block 125 connected thereto to cover the above subassembly whereby the position restriction plate 321 of the driven member 32 extends into the rotation guidance groove 122 of the upper housing 12, and the engaging hole 129 of the upper housing 12 engagingly receives the engaging protrusion 252 of the water division seat 25, thereby finishing the assembly of the upper housing 12 and the above subassembly;

8. Connecting the temperature restriction unit 22 to the straight post 211 of the rotation shaft 21, thereby finishing the assembly of the temperature restriction unit 22 and the rotation shaft 21;

9. Providing the rotation cover 31 to cover the upper housing 12 whereby the straight post 211 of the rotation shaft 21 extends through the shaft through hole 311 of the rotation cover 31, and the driving plate 312 of the rotation cover 31 extends through the rotation guidance groove 122 of the upper housing 12 and engages with the mating cutout 322 of the driven member 32, thereby finishig the assembly of the flow and temperature separation control valve of the present invention.

Figure 9:
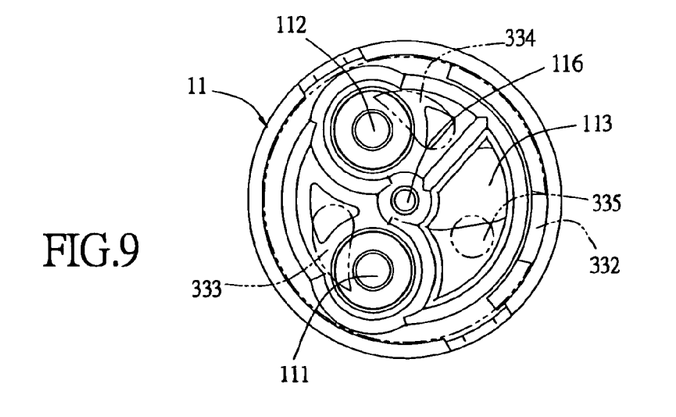
FIGS. 9–11 are schematic views showing operation of separately controlling cold and hot water flows through the flow control module.
Figure 10:
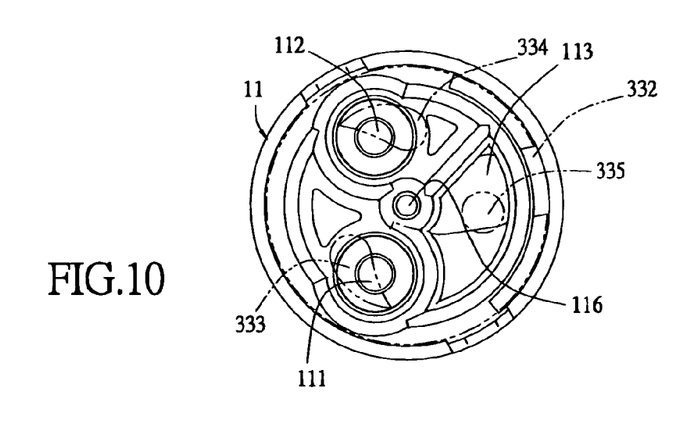
Figure 11:
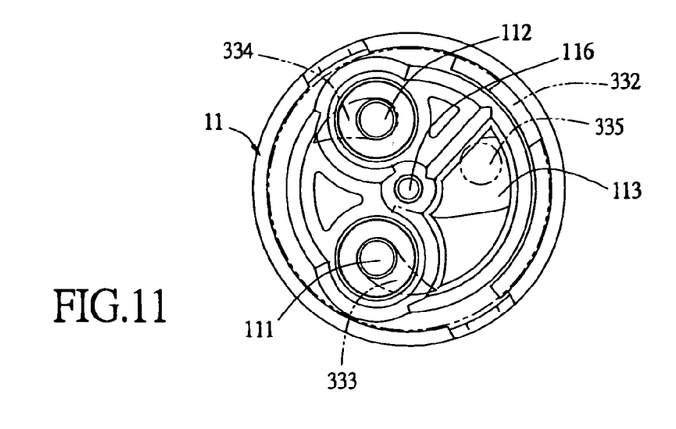

Referring to FIGS. 9–11, operation of separately controlling cold and hot water flows ( proportion of synchronous opening and closing, that's water flow magnitude) is shown. Since the rotation cover 31 and the straight post 211 of the rotation shaft 21 are not linked to move, when the rotation cover 31 is rotated (see FIG. 7), the rotation shaft 21 is not driven by the rotation cover 31. Therefore, the driven member 32 is driven to rotate by the driving plate 312 of the rotation cover 31, and then the flow control plate 33 is driven to rotate by the driven plate 323 of the driven member 32. Thus, the water flow is separately controlled through rotation of the flow, control plate 33 to control the synchronous opening and closing of the hot water inlet 111 and the cold water inlet 112 of the lower housing 11.

Figure 12:
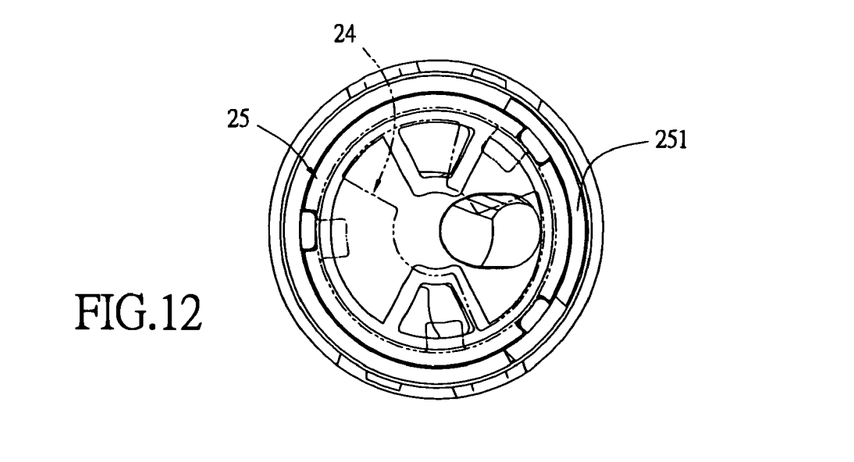
FIGS. 12–14 are schematic views showing operation of separately controlling cold and hot water flows through the temperature control module.
Figure 13:
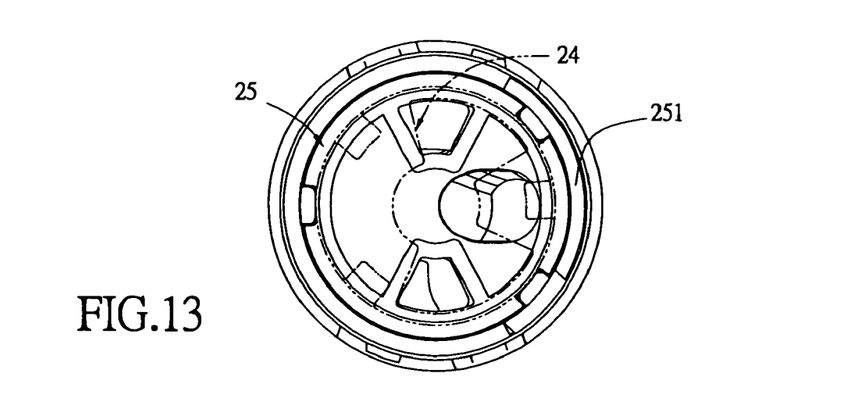
Figure 14:
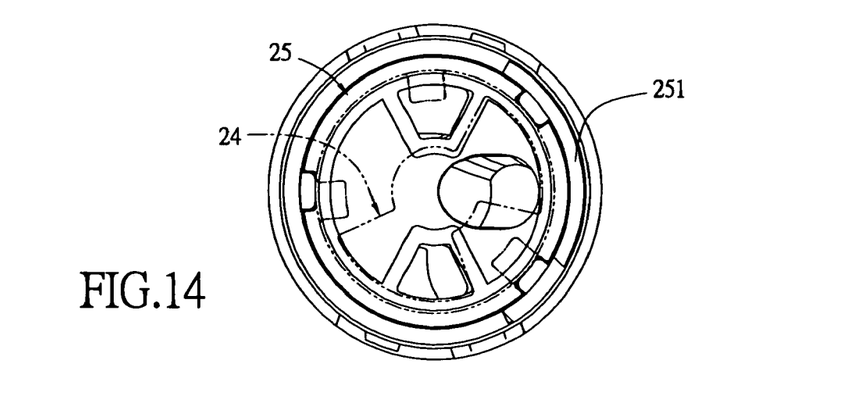

Referring to FIGS. 12–14, operation of separately controlling cold and hot water flows ( proportion of relative opening and closing, that's mixed proportion between the cold and hot water) is shown. Since the rotation cover 31 and the straight post 211 of the rotation shaft 21 are not linked to move, similarly the rotation cover 31 is not driven when the rotation shaft 21 rotates (see FIG. 4). The upper ceramic plate 23 is driven to rotate by the driving block 212 of the rotation cover 31. Therefore, the position relationship between the upper ceramic plate 23 and the lower ceramic plate 24 is changed and so mixed proportion of the cold and hot water between the upper ceramic plate 23 and the lower ceramic plate 24 is correspondingly changed. Then the mixed cold and hot water flows out through the water division seat 25 and the mixed water outlet 113 of the lower housing 11 thereby separately controlling the temperature of the outputted water flow.

Figure 6:
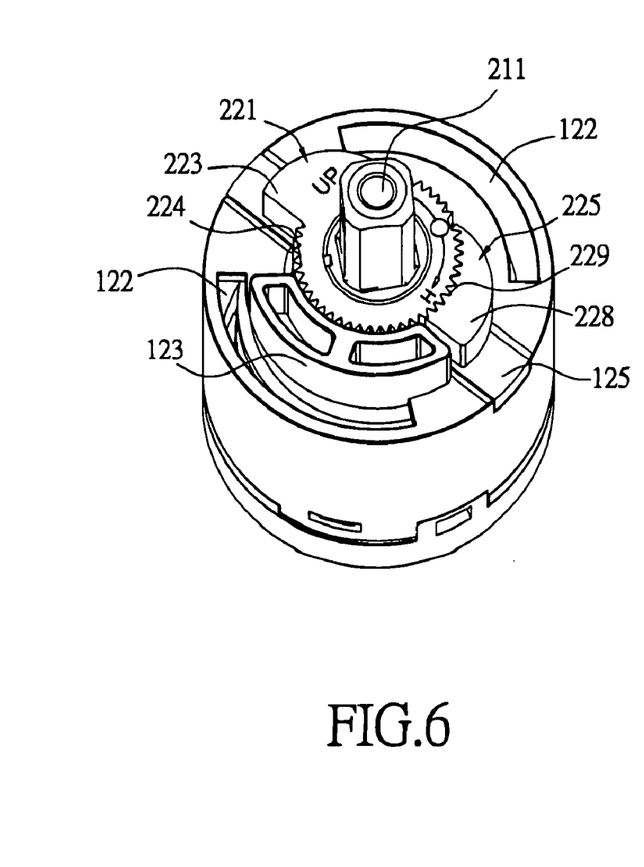
FIG. 6 is a perspective view of a temperature restriction unit and an upper housing of the temperature control module viewed from a top angle.

Referring to FIG. 6, a range of controlled temperature of the mixed water flow may be set through configuring the angle between the right block 223 and the left block 228 of the temperature restriction unit 22, and through the restriction block 123 of the upper housing 12, thereby restricting the max temperature of the mixed water flow for preventing from hurting a user due to overhigh temperature of the mixed water flow.

It is understood that the invention may be embodied in other forms without departing from the spirit thereof. Thus, the present examples and embodiments are to be considered in all respects as illustrative and not restrictive, and the invention is not to be limited to the details given herein.

The invention claimed is:

1. A flow and temperature separation control valve, comprising:
   a valve housing for connecting to a water faucet, comprising an upper housing and a lower housing;
   a temperature control module received in the valve housing for controlling the temperature of the outputted water flow, comprising:
      a rotation shaft having a straight post non-interferentially extending from the upper portion of the upper housing;
      an upper ceramic plate mounted on the bottom of the rotation shaft and rotatable with the rotation shaft;
      a lower ceramic plate disposed below the upper ceramic plate and closely jointing to the upper ceramic plate; and
      a water division seat mounted on the lower housing, the water division seat connecting the lower housing and the upper housing together, the water division seat supporting the lower ceramic plate thereon; and
   a flow control module received in the valve housing for controlling the outputted flow, comprising:
      a rotation cover covering the upper portion of the upper housing, a through hole being defined in the center of the rotation cover for non-interferential extension of the straight post of the rotation shaft;
      a driven member received in the upper housing, the driven member receiving the rotation shaft, the upper ceramic plate, the lower ceramic plate and the water division seat therein and being rotatable with the rotation cover; and
      a flow control plate pivotally disposed between the water division seat and the lower housing, the driven member being drivable to rotate the flow control plate.

2. The flow and temperature separation control valve as claimed in claim 1, wherein the valve housing comprises:
   the lower housing with a hot water inlet, a cold water inlet and a mixed water outlet being defined therein, a pivot shaft extending from the center portion of the lower housing, two symmetrical upper tabs upwardly extending from the upper periphery of the lower housing, an engaging hole being defined in each of the upper tabs; and
   the upper housing generally close at the upper portion thereof, hollow at the middle portion thereof and open at the lower poriton thereof, a shaft through hole being defined in the center of the upper portion of the upper housing for non-interferential extension of the straight post of the rotation shaft, two symmetrical arcuate rotation guidance grooves being defined in the upper periphery of the upper housing, two receiving cutouts being defined in the lower periphery of the upper housing for respectively providing access to the upper tabs of the lower housing, two symmetrical lower tabs downwardly extending from the lower periphery of the upper housing, an engaging hole being defined in each of the lower tabs.

3. The flow and temperature separation control valve as claimed in claim 2, wherein two symmetrical driving plates downwardly extend from the lower periphery of the rotation cover for respectively extending into the rotation guidance grooves of the upper housing.

4. The flow and temperature separation control valve as claimed in claim 3, wherein two symmetrical position restriction plates upwardly extend from the upper periphery of the driven member, a mating cutout is defined in each of the position restriction plates for insertion of the driving plate of the rotation cover, and a driven plate downwardly extends from the lower periphery of the driven member.

5. The flow and temperature separation control valve as claimed in claim 4, wherein a pivot shaft hole is defined in the center of the flow control plate for extension of the pivot shaft of the lower housing, a mating cutout is defined in the periphery of the flow control plate for receiving the driven plate of the driven member, and a hot water through hole, a cold water through hole, and a mixed water through hole are respectively defined in the flow control plate.

6. The flow and temperature separation control valve as claimed in claim 5, wherein an arcuate receiving groove is defined in the water division seat adjacent to the periphery thereof for rotatably receiving the driven plate of the driven member, and a plurality of engaging protrusions extends from the peripheral surface of the water division seat for respectively engaging with the upper tabs of the lower housing and the lower tabs of the upper housing.

7. The flow and temperature separation control valve as claimed in claim 6, wherein a leakproof gasket is disposed between the lower ceramic plate and the water division seat, and three through holes are defined in the leakproof gasket.

8. The flow and temperature separation control valve as claimed in claim 7, wherein a leakproof gasket is disposed between the water division seat and the flow control plate, and three through holes are defined in the leakproof gasket.

9. The flow and temperature separation control valve as claimed in claim 8, wherein a leakproof gasket is disposed between the flow control plate and the lower housing, and three through holes are defined in the leakproof gasket.

10. The flow and temperature separation control valve as claimed in claim 9, wherein a leakproof gasket is disposed at the lower portion of the lower housing, and three through holes are defined in the leakproof gasket.

11. The flow and temperature separation control valve as claimed in claim 10, wherein each leakproof gasket is made of plastic.

12. The flow and temperature separation control valve as claimed in claim 1, wherein the cross section of the straight post of the rotation shaft is square, triangular or the like.

13. The flow and temperature separation control valve as claimed in claim 11, wherein an engaging recess is defined in the upper portion of the upper housing, a strengthening block is received in the engaging recess, and a through hole is defined in the center of the strengthening block for non-interferential extension of the straight post of the rotation shaft.

14. The flow and temperature separation control valve as claimed in claim 13, wherein the strengthening block is made of metal.

15. The flow and temperature separation control valve as claimed in claim 14, wherein a fan-shaped protruding restriction block extends from the upper portion of the upper housing, and a temperature restriction unit is connected to the straight post of the rotation shaft and is rotatable with the rotation shaft.

16. The flow and temperature separation control valve as claimed in claim 15, wherein the temperature restriction unit comprises a right restriction block and a left restriction block, wherein
a tube receiving hole is defined in the center of the right restriction block, a wing-shaped right block outwardly and downwardly extends from the periphery of the right restriction block for abutting against the restriction block of the upper housing when rotating, a plurality of successional aligning teeth is formed at the inner side surface of the right block and at the peripheral surface of the right restriction block;
the left restriction block has a tube projecting from the center thereof for extending into the tube receiving hole of the right restriction block, a shaft receiving hole is defined along an axis of the left restriction block and has a cross section consistent to that of the straight post of the rotation shaft for extension of the straight post of the rotation shaft thereby rotating with the rotation shaft, a wing-shaped left block outwardly and upwardly extends from the periphery of the left restriction block for abutting against the restriction block of the upper housing when rotating, a plurality of successional engaging teeth is formed at the inner side surface of the left block and at the peripheral surface of the left restriction block for mating with the aligning teeth of the right restriction block and the right block.

17. The flow and temperature separation control valve as claimed in claim 15, wherein the temperature restriction unit comprises a right restriction block and a left restriction block, wherein
a plurality of successional aligning teeth is formed at the right restriction block, a wing-shaped right block outwardly and downwardly extends from the periphery of the right restriction block for abutting against the restriction block of the upper housing when rotating; and
a plurality of successional engaging teeth is formed at the left restriction block for mating with the aligning teeth of the right restriction block, a shaft receiving hole is defined along an axis of the left restriction block and has a cross section consistent to that of the straight post of the rotation shaft for extension of the straight post of the rotation shaft thereby rotating with the rotation shaft, a wing-shaped left block outwardly and upwardly extends from the periphery of the left restriction block for abutting against the restriction block of the upper housing when rotating.

* * * * *